United States Patent [19]
Blomberg

[11] Patent Number: 4,886,405
[45] Date of Patent: Dec. 12, 1989

[54] WALL MOUNTING DEVICE

[76] Inventor: Ingvar M. Blomberg, 10025 E. Girard, #131-E, Denver, Colo. 80231

[21] Appl. No.: 302,670
[22] Filed: Jan. 27, 1989
[51] Int. Cl.⁴ .................. F16B 13/04; F16B 21/00
[52] U.S. Cl. .................. 411/16; 411/341; 411/350; 411/913
[58] Field of Search .................. 411/16, 17, 153, 173, 411/251, 252, 340–343, 350, 438, 508, 908, 913, 981, 182; 267/166.1

[56] References Cited

U.S. PATENT DOCUMENTS

| | | | |
|---|---|---|---|
| 1,264,677 | 4/1918 | Murrell | 411/438 |
| 1,370,319 | 3/1921 | Kennedy | 411/341 |
| 2,123,527 | 7/1938 | Golden | 411/350 |
| 2,201,930 | 5/1940 | Stark | 411/153 X |
| 2,842,999 | 7/1958 | Huston | 411/16 |
| 3,373,647 | 3/1968 | Sherock | 411/16 |
| 4,004,486 | 1/1977 | Schenk | 411/16 |
| 4,415,299 | 11/1983 | Smith et al. | 411/340 |

FOREIGN PATENT DOCUMENTS 617612  2/1949  United Kingdom ............... 411/153

Primary Examiner—Gary L. Smith
Assistant Examiner—Douglas E. Ringel
Attorney, Agent, or Firm—Charles C. Corbin

[57] ABSTRACT

A device for bolting an article to a wall board, using a pre-drilled hole in the wall, is disclosed. The device comprises a volt, and an anchoring portion threadedly mounted to the bolt. This anchoring portion is resiliently deformable in one direction which allows it to pass one way through the hole and has a normal configuration wherein it grasps the inside surface of the wall board to hold the attached bolt against removal from the hole. The anchoring portion comprises a resilient, ribbon-like strip spirally wound into a cone-like configuration and resiliently held therein with inner and outer edge portions of the strip overlapping and in close mutual proximity. A nut for receiving the bolt is affixed to a first, inner end of the spirally wound strip and is held with its bore aligned with the central axis of the conical configuration. The anchor may be uncoiled when the turns of the spiraling strip are urged apart in one direction axially. However, the coiled anchor retains its coiled, conical configuration when it is compressed in the opposite direction, by virtue of holding engagement of the overlapping portions of the strip. The outer edge portion of the outermost turn of the coiled strip presents a generally circular load bearing region for engaging a planar surface.

6 Claims, 2 Drawing Sheets

WALL MOUNTING DEVICE

BACKGROUND

1. Field of the Invention

The present invention relates to a device for fastening an article to a wall board. More particularly the invention relates to such a device that has a bolt component that mounts an anchor portion with a configuration that is resiliently alterable to allow its insertion through a pre-cut hole in a wall board.

2. Prior Art

Common commercially available devices for fastening an article to the wall board of a typical building interior wall, using a pre-cut hole, have a construction such as shown in FIG. 3 with a pair of pivoting anchor arms that are urged by a spring into the spread configuration shown. These arms may be urged to a streamlined configuration, with small frontal profile, to allow insertion through a mounting hole. When fully inserted therethrough the arms will spring open. The tightening of the bolt, which is mounted through an article to be attached to a wall, will pull the arms into engagement with the inner surface of the wall, which most commonly is so called dry wall, composed of a compressed gypsum or gypsum-like particulate material. While such conventional devices are simple and easy to use, they have drawbacks which limit their effectiveness. Leading edge portions 12, of a mounted prior art device, will compress against a wall board surface and embed somewhat therein by virtue of significant pressure exerted along the relatively narrow surface presented by these edge portions. When the particulate inner structure of a typical dry wall is pierced in this manner, an initially secure anchoring can be progressively loosened and weakened, because of vibration of the fastener. The tendency of these conventional devices, is to pierce the wall board, and they will also lead to deterioration of the structural integrity of the wall.

Some other wall fastener designs are proposed in U.S. Pat. Nos. 4,004,486 and 3,373,647. These devices appear inadequate for application to wall board applications since they rely on an anchor portion that must make binding engagement with the crumbleable inside of a predrilled hole.

SUMMARY OF THE INVENTION

In view of the foregoing drawbacks and disadvantages it is an object of the present invention to provide a fastening device for bolting an article to a wall board which grasps the inside surface of the wall with a binding force that is more evenly spread than with prior devices.

Another object of the present invention is the provision of a wall fastener for wall boards of gypsum and the like material which does not tend to pierce the wall structure.

A further object is to provide a fastener that grasps the inner surface of a wall board along a generally circular region about the mounting hole for the fastener.

A still further object is to provide a fastener that has an anchor portion which is adapted for applying a clamping force over a greater surface area than previous devices.

The foregoing, and additional objects and advantages, will be provided by the present invention which comprises a fastener mountable through a pre-cut hole in a wall board and which has a bolt, and which features an anchor portion that threadedly receives the bolt and which is resiliently deformable in one direction to allow insertion through the hole. The anchor portion includes a ribbon-like strip of resilient material that is spirally wound for a plurality of turns and resiliently retained in a conical configuration. Edge portions of the spirally wound strip lie in mutually close overlapping relationship. The anchor portion also includes a threaded bore portion affixed to one end of the strip, at the apex of the conical configuration, and with the bore aligned along the central axis of the conical configuration. The outer edge of the outermost turn of the spirally wound strip presents a generally circular edge region for engaging a planar surface. When such engagement occurs and the threaded bore is urged towards the planar surface, the overlapping edge portions of the spirally wound strip will make binding frictional engagement such that the anchor portion rigidly holds its generally conical configuration. Thus the anchor of the present invention can exert against a wall board a clamping force that is spread fairly evenly in a general circle around a mounting hole.

The spirally wound strip is resiliently uncoilable in the axial direction in which the turns of the strip are spread apart. This uncoiling allows insertion of the anchor through a mounting hole. Once fully inserted through the hole the anchor will spring to its coiled conical configuration.

DETAILED DESCRIPTION OF THE INVENTION

Figure 1:
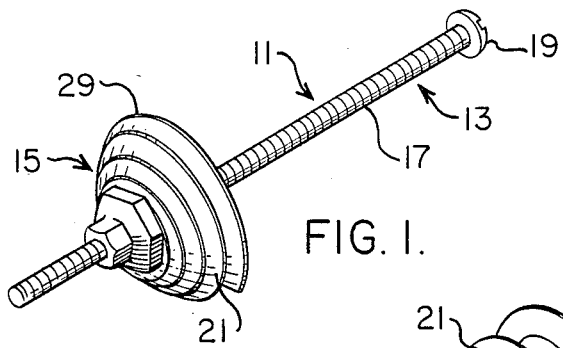
FIG. 1 is a perspective view of a fastener according to the present invention.
Figure 5:
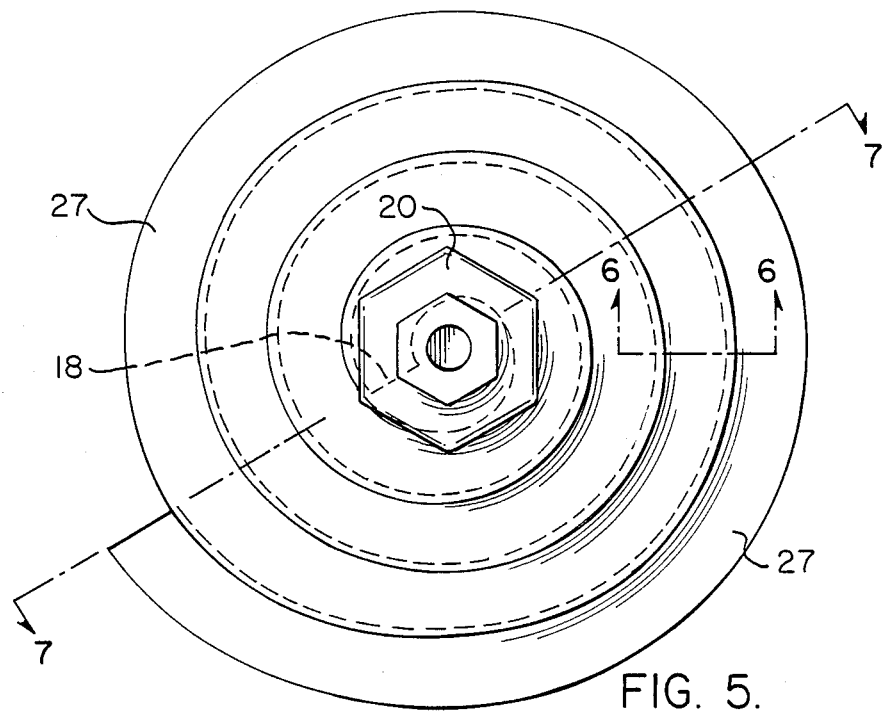
FIG 5 is a plan end view of a fastener according to the present, invention.
Figure 7:
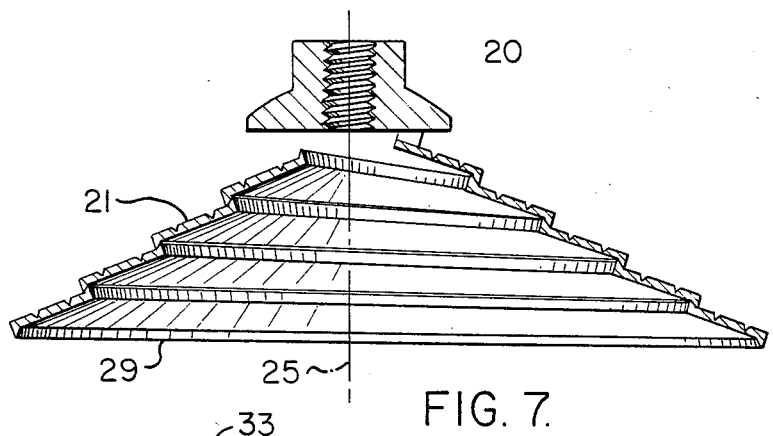
FIG. 7 is a sectional view taken along the line 7—7 of FIG. 5.
Figure 6:
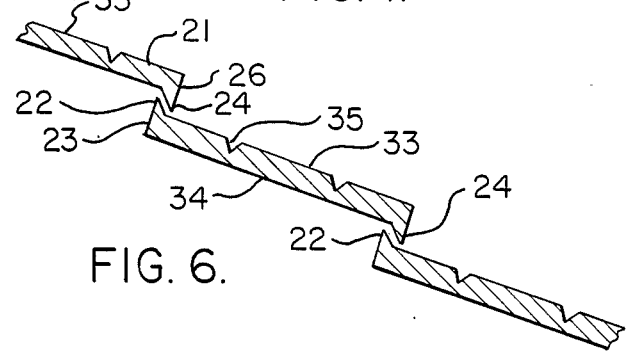
FIG. 6 is an enlarged sectional view taken along the line 6—6 of FIG. 5.

Referring now to the drawings, FIG. 1 shows a preferred embodiment of the present invention in a wall fastener 11 the main components of which are bolt 13 and resiliently deformable anchor 15. The bolt 13 is of common design with threaded portion 17 and head 19 which is preferably slotted to receive a screwdriver but which may be shaped to be engaged by a wrench. Anchor 15 is constructed of a strip 21 of durable resilient material which is wound spirally in a plurality of radially expanding turns as shown in FIG. 5. FIG. 5 also shows, most importantly, that the spirally wound strip 21 has overlapping edge portions. FIGS. 6 and 7 show that strip 21 has a ribbon-like configuration with a first major surface or top side 33, and an opposing second major surface 34. The strip 21 is preferably formed of a spring steel, and resiliently holds the coiled configuration here shown in FIGS. 1, 4 and 5, with its overlapping edges in close relationship or touching. Besides using steel, a durable elastic polymeric material may prove suitable for strip 21. A close look at the overlapping edges shows in FIG. 6 a first ridge 22 extending along and projecting upwardly from the inner edge 23 of strip 21, and a second ridge 24 extending along and projecting downwardly from the outer edge 26.

Figure 4:
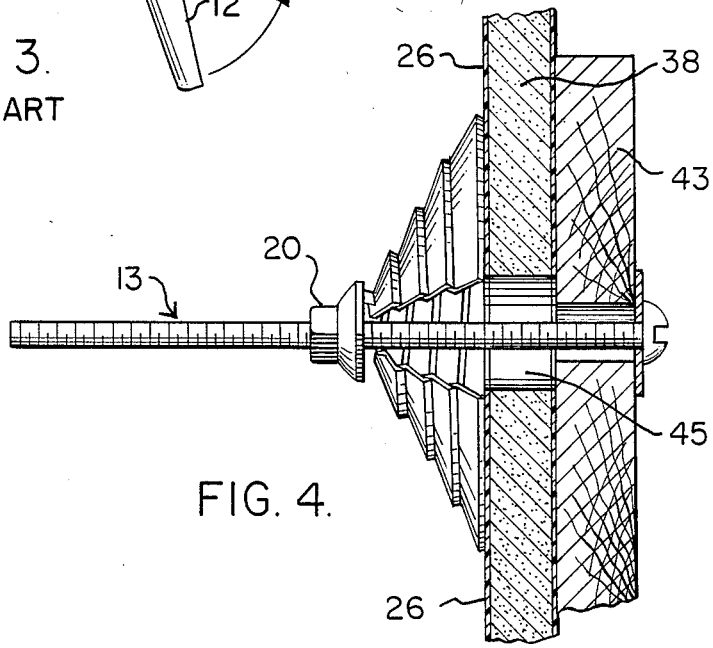
FIG 4 is a partial sectional view showing application of a fastener according to the invention.

As FIG. 4 and 7 best illustrate, another important aspect of the inventive anchor 15 is its general conical configuration. It will be seen that by compression the anchor 15 in one axial direction overlapping portions will frictionally engage each other to rigidly hold this conical configuration. In the preferred embodiment the strip 21, and the general conical configuration it holds, slopes at about 45° to 70° from the central axis 25.

Anchor 15 includes a nut 20 for receiving bolt 13, and affixed by welding to the first end 18 of strip 21. Note that the bore of nut 20 is aligned along the central axis 25 of the general conical configuration of the anchor.

When strip 21 is in its ordinary, coiled conical configuration, the outermost turn 27 will present a generally circular outer edge portion at 29 for engaging the planar surface of a wall board in a manner to be described in greater detail hereinafter.

Figure 2:
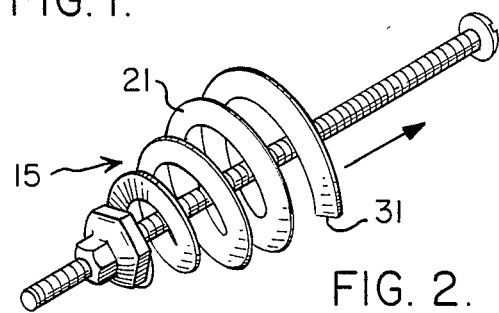
FIG. 2 is a similar view showing the uncoiling of the anchor portion of the inventive fastener.
Figure 3:
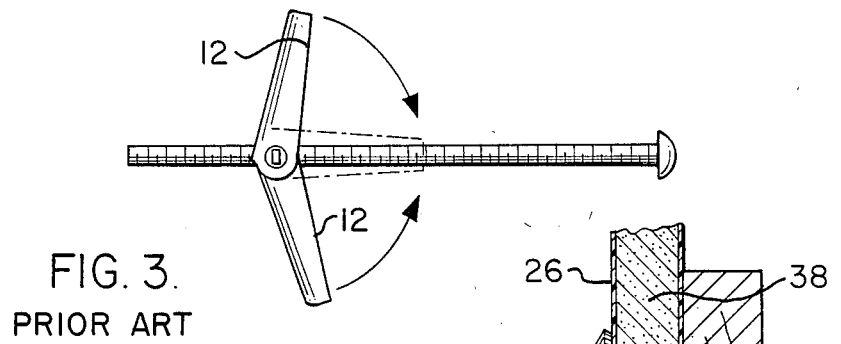
FIG 3 is an illustration of a common prior art device.

The overlapping structure of anchor strip 21 is such that the outer end 31 may be resiliently urged in the direction of the arrow in FIG. 2 so as to greatly separate the turns of strip 21. When released from this uncoiled configuration the coil 21 will spring back to its normal conical configuration. It will be seen that the uncoiling ability of anchor 15 allows it to be manipulated through a hole in a wall board. The sectional view of FIG. 7 shows that strip 21 is angled at about 60 degrees to the central axis 25. In other embodiments according to the invention the walls of the anchor strip may be sloped at other angles sufficient to achieve conical configurations in which the anchor may hold itself in the manner desired.

While anchor 15 may be easily uncoiled as described above, it will greatly resist deformation when compressed in the opposite direction, such as when the outer edge portion 29 is urged into compressing contact with a wall board surface. Such an urging occurs when bolt 13 draws the nut 20 towards the inside surface 26 of wall board 38 as viewed in FIG. 4. This compressive action brings the overlapping edge portions of strip 21 into engagement which frictionally binds and holds the turns of strip 21 in the unified generally conical configuration shown.

Note that FIG. 6 shows the details of a preferred embodiment in which the top side 33 of strip 21 is provided with at least one groove 35 which is adapted to be engaged by the ridge 24. This ensures that a frictional hold between spiral turns of strip 21 is achieved upon compression of anchor 15 as described above. In the application of the invention illustrated in FIG. 4 a fastener according to the invention attaches an article 43 to a wall board 38. It will be appreciated that the outer edge portion 29 engages inner surface 26 in a general circle about the pre-cut hole 45.

While there has been described a particular embodiment of the invention, it will be obvious to those skilled in the art that various changes and modifications may be made therein without departing from the invention, such as changes in the number of spiral turns, or variations in the slope of the conical configuration provided. Thus it is aimed to cover all changes and modifications as fall within the true spirit and scope of the invention.

What is claimed is:

1. Device for mounting an article to a wall board, through a hole in said wall board, comprising:
   (a) threaded bolt;
   (b) anchor portion comprising a ribbon-like strip of resilient material having a generally flat rectangular cross-sectional configuration and spirally wound in a plurality of turns so as to be resiliently held in a conical configuration wherein edge portion of adjoining turns of said strip lie closely in overlapping relationship, and wherein the outermost turn of said spirally wound strip presents a generally circular portion for engaging a planar surface and exerting a force thereon, and said anchor having a threaded bore portion for receiving said bolt and affixed to a first end of said spirally wound strip and with the bore of said threaded bore portion aligned with the central axis of said conical configuration, said strip being resiliently uncoilable in one axial direction when its turns are urged apart in one direction, and maintaining its conical configuration by virtue of said overlapping edge portions making mutual frictional binding engagement when said generally circular portion is urged against a planar surface, and wherein said strip has a first major surface and a second major surface, and a first ridge extending along the inner edge of said first major surface and projecting therefrom in a first direction and a second ridge extending along the outer edge of said second major surface and projecting in a direction which is opposite said first direction, wherein said first ridge is engagable with said second major surface and said second ridge is engagable with said first major surface.

2. Device as defined in claim 1 wherein said first major surface has at least one groove extending therealong adapted for being engaged by said second ridge.

3. Device as defined in claim 2 wherein pressing of said generally circular portion of said spirally wound strip against a planar surface will cause said second ridge to slide into binding engagement with said at least one groove.

4. Device as defined in claim 1 wherein said strip is constructed of spring steel.

5. Device as defined in claim 1 wherein said conical configuration slopes at from about 45 to 70 degrees from said central axis.

6. Device as defined in claim 1 wherein said strip lies at an angle in the range of 45 to 70 degrees from said central axis.

* * * * *